United States Patent

Dahms 4,006,026

Feb. 1, 1977

[54] METHOD OF IMPROVING THE TARNISH RESISTANCE OF SILVER

[75] Inventor: Wolfgang Dahms, Berlin, Germany

[73] Assignee: Schering Aktiengesellschaft, Berlin and Bergkamen, Germany

[22] Filed: Feb. 21, 1973

[21] Appl. No.: 334,243

[52] U.S. Cl. .................... 106/14; 106/3; 252/389 R; 252/395

[51] Int. Cl.$^2$ .......................... C09D 5/08

[58] Field of Search ............... 260/429.7; 106/2, 3, 106/15 AF, 14; 252/389 R, 395

[56] References Cited

UNITED STATES PATENTS

| | | | |
|---|---|---|---|
| 2,257,750 | 10/1941 | Lincoln et al. | 252/389 R |
| 2,257,751 | 10/1941 | Lincoln et al. | 252/389 R |
| 2,841,501 | 7/1958 | Murphy | 106/3 |
| 3,117,012 | 1/1964 | Aler et al. | 106/3 |
| 3,330,672 | 7/1967 | Kroll et al. | 106/3 |
| 3,398,003 | 8/1968 | Smith et al. | 106/3 |
| 3,410,703 | 11/1968 | Kroll et al. | 106/14 |
| 3,615,305 | 10/1971 | Muhler | 106/3 |
| 3,631,082 | 12/1971 | Kino et al. | 260/429.7 |
| 3,660,442 | 5/1972 | Ludwig | 260/429.7 |

*Primary Examiner*—Lorenzo B. Hayes
*Attorney, Agent, or Firm*—Joseph F. Padlon

[57] ABSTRACT

The tarnish resistance of silver and silver alloy surfaces can be improved by brief contact in a liquid medium with compounds of quadrivalent tin bound by at least one valence to alkyl having 2 to 22 carbon atoms, and by the remaining valences to sulfur, the tin compounds being of the formulas

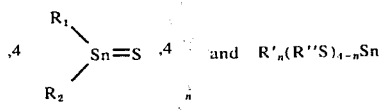

in said formulas $R_1$, $R_2$, and $R'$ being alkyl having 2 to 22 carbon atoms, $R''$ being alkyl having 4 to 22 carbon atoms or $-CH_2COOR_3$, $R_3$ being alkyl having 1 to 22 carbon atoms, and $n$ being 1, 2, or 3.

7 Claims, No Drawings

METHOD OF IMPROVING THE TARNISH RESISTANCE OF SILVER

This invention relates to the passivation of metal surfaces essentially consisting of silver, and particularly to a method of improving the tarnish resistance of such surfaces.

Silver and its alloys, in which silver is the predominant component, tend to tarnish in gaseous atmospheres containing hydrogen sulfide, particularly in the simultaneous presence of ammonia. It has been proposed to improve the tarnish resistance of surfaces essentially consisting of silver, that is, having a tarnishing behavior equal or similar to that of pure silver, by the formation of conversion coatings by chemical and electrochemical methods (German Pat. Nos. 910,862; 1,116,216; 1,243,808; and 1,279,428), but some of the known conversion coatings provide inadequate protection, particularly in the simultaneous presence of hydrogen sulfide and ammonia, which are common atmospheric contaminants, and others require chemicals not readily available at practical cost.

It has now been found that the tarnish resistance of surfaces essentially consisting of silver can be improved by contact with a compound of quadrivalent tin in which the tin is bound to alkyl having 2 to 22 carbon atoms by at least one of its valences, and to sulfur by the remaining valences, but by at least one.

The compounds effective in the method of the invention have the formulas

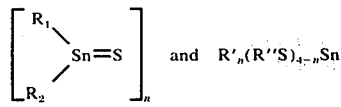

$$\left[ \begin{array}{c} R_1 \\ \diagdown \\ \diagup \\ R_2 \end{array} Sn=S \right]_n \quad \text{and} \quad R'_n(R''S)_{4-n}Sn$$

wherein $R_1$, $R_2$, and $R'$ are said alkyl, $R''$ is alkyl having 4 to 22 carbon atoms or $-CH_2COOR_3$, $R_3$ is alkyl having 1 to 22 carbon atoms, and $n$ is 1, 2, or 3. They are preferably used in a liquid medium.

The alkyl radicals represented by $R_1$, $R_2$, $R'$, $R''$, and $R_3$ may have straight or branched chains within the limits of carbon atoms indicated above.

Among the compounds encompassed by the above formulas, the following have been found to provide particularly effective protection against tarnish:

| | |
|---|---|
| Dibutyltin sulfide | $(C_4H_9)_2Sn=S$ |
| Didodecyltin sulfide | $(C_{12}H_{25})_2Sn=S$ |
| Tris-(butyltin sulfide) | $[(C_4H_9)_2Sn=S]_3$ |
| Dibutyltin di(isooctylthioglycolate) | $(C_4H_9)_2Sn(S.CH_2COOC_8H_{17})_2$ |
| Dioctyltin di(isooctylthioglycolate) | $(C_8H_{17})_2Sn(S.CH_2COOC_8H_{17})_2$ |
| Didodecyltin di(butylthioglycolate) | $(C_{12}H_{25})_2Sn(S.CH_2COOC_4H_9)_2$ |
| Dioctadecyltin di(butylthioglycolate) | $(C_{18}H_{37})_2Sn(S.CH_2COOC_4H_9)_2$ |
| Dibutyltin di(dodecylmercaptide) | $(C_4H_9)_2Sn(S.C_{12}H_{25})_2$ |
| Monooctyltin tri(isooctylthioglycolate) | $C_8H_{17}Sn(S.CH_2COOC_8H_{17})_3$ |

These compounds used in the method of the invention are partly known, and those not known heretofore are readily prepared by known methods, as by reacting alkyltin halides with sodium sulfide, mercaptanes, or thioglycolic acid esters.

The effective amounts of the sulfur-bearing alkyltin compounds vary with the nature of the medium in which they are applied to the surface to be protected, and particularly with the mode of application. Concentrations of 0.01 to 1.5% by weight are preferred in fluids in which the silver-surfaced objects are to be dipped, while more viscous and paste-like polishing compositions may require 0.1 to 5%.

Dipping compositions may contain water, ethanol, dioxane, trichloroethylene and other inert liquid media, also addition agents some of which may improve the effectiveness of the tin compounds of the invention or increase the useful life of the composition. Mercaptanes and aliphatic disulfides having alkyl groups of approximately 10 to 20 carbon atoms may be present in amounts of up to 5%, and surfactants such as wetting agents and emulsifiers provide the expected effects when present in amounts of 0.005 to 1%. Dialkylphosphates, such as dilauryl phosphate, and dialkyl sulfosuccinates, such as dilauryl sulfosuccinate, have been found to be particularly useful surfactants in this method.

Liquid polishing pastes and polishing emulsions employed in the method of the invention may contain mild abrasives, such as calcined magnesia or chalk powder, as is known in itself, also wetting agents, and a liquid medium. Solid polishing pastes, in addition to containing the afore-defined tin compounds, are compounded in the usual manner from abrasives, for example, rouge, French Chalk or pumice, and a binder which may be a fat or grease, wax, paraffin, or an alcohol of high molecular weight and having the required paste-like consistency.

The following Examples are further illustrative of this invention. All percentage values are by weight unless stated otherwise.

EXAMPLE 1

15 g Dioctyltin-di-(isooctylthioglycolate) was dissolved in 985 g lukewarm trichloroethylene, and the solution so obtained was cooled to 20° C. A silver foil was carefully degreased and dried, and was dipped in the solution for two minutes. After removal from the solution, it was airdried and stored in a bell jar also containing 100 ml of a freshly prepared, aqueous solution of 10% ammonium sulfide in an open dish.

The treated silver foil showed the first trace of tarnish after six hours of exposure, but its silvery appearance still predominated after 24 hours of storage in the heavily contaminated atmosphere.

EXAMPLE 2

1 g Tris(dibutyltin sulfide) and 100 g octadecanethiol were dissolved in 849 g trichloroethylene, and a clean silver foil was immersed in the solution for two minutes at 20° C. When tested in the manner described in Example 1, the treated foil did not show any tarnish even after 24 hours' exposure.

EXAMPLE 3

A silver polish was prepared by intimately mixing 110 g fine-grained calcined magnesia, 10 g carboxymethylcellulose, 5 g dihexadecane disulfide, 5 g monooctyltin-tri(isooctylthioglycolate), and 870 g isopropanol.

The emulsion or suspension so prepared was used for polishing silverware, and the polished silverware did not show any tarnish when inspected after four months' exposure to the atmosphere in an industrial neighborhood.

EXAMPLE 4

A solution consisting of 4.0% L(+) tartaric acid, 77.0% dioxane, 1.0% poly-(octyltin sulfide), 3.6% thiourea, and 14.4% dimethylformamide was prepared by first dissolving the tartaric acid in the dioxane, heating the solution to its boiling point while adding the poly-(octyltin sulfide), cooling the solution so obtained, and mixing it cold with a separately prepared solution of the thiourea in the dimethylformamide.

The poly-(octyltin sulfide) was a mixture of compounds of the formula $(C_8H_{17}SnS_{1.5})_n$ weherein $n$ varied between 2 and 8.

The solution ultimately produced was heated to a temperature of 60° C, and a piece of badly tarnished silver was immersed therein. The tarnish disappeared instantaneously, and the cleaned piece of silver thereafter showed excellent resistance to tarnishing in a contaminated atmosphere.

When used at lower temperatures, the solution was as effective though slightly slower in removing tarnish.

EXAMPLE 5

A solution was prepared as in Example 4 from 4.0% L(+) tartaric acid, 76.85% dioxane, 0.10% poly-(butyltin sulfide), 3.6% thiourea, and 14.4% dimethylformamide. A silver cleaning emulsion was prepared by stirring into this solution 0.9% n-octadecanethiol, 0.05% dilauryl sulfosuccinate, and 0.1% alkylpolyethyleneglycol containing from 8 to 18 carbon atoms in the alkyl group.

The emulsion was most effective when used for cleaning silver at temperatures between 20° and 30° C, and silverware cleaned by applying the emulsion by means of cloth did not show tarnish after being exposed indoors for 4 months.

The same or similar results were obtained when the sulfurbearing organic tin compounds in Examples 1 to 5 were replaced by analogous and homologus compounds including dibutyltin sulfide, didodecyltin sulfide, dibutyltin-di(isooctylthioglycolate), didodecyltin-di(butylthioglycolate), dioctadecyltin di(butylthioglycolate), dibutyltin di(dodecylmercaptide), and the like.

What is claimed is:

1. A method for passivating and improving the tarnish resistance of a metal surface consisting essentially of silver which comprises applying to said surface a preparation containing an effective amount therefor of an active ingredient which is a compound of quadrivalent tin selected from the group consisting of a compound of the formula

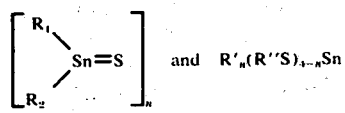

wherein $R_1$, $R_2$ and $R'$ are alkyl having 2 to 22 carbon atoms, $R''$ is alkyl having 4 to 22 carbon atoms or $-CH_2COOR_3$, where $R_3$ is alkyl having 1 to 22 carbon atoms, and $n$ is 1, 2 or 3, distributed in a liquid carrier.

2. A method as set forth in claim 1, wherein $R_1$ and $R_2$ are each butyl or dodecyl, and $n$ is one.

3. A method as set forth in claim 1, wherein $R_1$ and $R_2$ are each butyl, and $n$ is 3.

4. A method as set forth in claim 1, wherein $R'$ is butyl, $R''$ is $-CH_2COOR_3$, $R_3$ is isooctyl, and $n$ is 2.

5. A method as set forth in claim 1, wherein $R'$ is octyl, $R''$ is $-CH_2COOR_3$, $R_3$ is isooctyl, and $n$ is 1 or 2.

6. A method as set forth in claim 1, wherein $R'$ is dodecyl or octadecyl, $R''$ is $-CH_2COOR_3$, $R_3$ is butyl, and $n$ is 2.

7. A method as set forth in claim 1, wherein $R'$ is butyl, $R''$ is dodecyl, and $n$ is 2.

* * * * *